US011582344B2

(12) United States Patent
Buckley

(10) Patent No.: US 11,582,344 B2
(45) Date of Patent: Feb. 14, 2023

(54) DISPLAYING A TEXTUAL MESSAGE BASED ON CONFIGURATION OF THE USER EQUIPMENT

(71) Applicant: Kingstar Technologies, Inc., San Diego, CA (US)

(72) Inventor: Adrian Buckley, Tracy, CA (US)

(73) Assignee: Kingstar Technologies, Inc., San Diego, CA (US)

( * ) Notice: Subject to any disclaimer, the term of this patent is extended or adjusted under 35 U.S.C. 154(b) by 280 days.

(21) Appl. No.: 16/940,999

(22) Filed: Jul. 28, 2020

(65) Prior Publication Data

US 2021/0051229 A1 Feb. 18, 2021

Related U.S. Application Data

(60) Provisional application No. 62/887,956, filed on Aug. 16, 2019.

(51) Int. Cl.

| | |
|---|---|
| ***H04M 3/00*** | (2006.01) |
| ***H04M 3/436*** | (2006.01) |
| ***G06F 16/17*** | (2019.01) |
| ***H04L 65/1069*** | (2022.01) |
| ***H04L 65/1104*** | (2022.01) |

(52) U.S. Cl.

CPC .......... *H04M 3/436* (2013.01); *G06F 16/173* (2019.01); *H04L 65/1069* (2013.01); *H04L 65/1104* (2022.05); *H04M 2203/2033* (2013.01); *H04M 2203/2038* (2013.01);

(Continued)

(58) Field of Classification Search

CPC ......... H04M 3/436; H04M 2203/2033; H04M 2203/2038; H04M 2203/2061; H04M 2203/252; H04M 2203/6027; G06F 16/173; H04L 65/1104; H04L 65/1069

See application file for complete search history.

(56) References Cited

U.S. PATENT DOCUMENTS

| | | | | |
|---|---|---|---|---|
| 2007/0230678 A1* | 10/2007 | Bloebaum | H04M 3/02 | 379/211.01 |
| 2013/0272513 A1* | 10/2013 | Phadnis | H04M 3/42042 | 379/93.01 |

FOREIGN PATENT DOCUMENTS

| | | | | |
|---|---|---|---|---|
| CA | 2161968 C | * | 8/2000 | H04M 3/248 |
| CN | 105721660 A | * | 6/2016 | H04M 1/663 |

OTHER PUBLICATIONS

International Search Report and Written Opinion received for PCT Application Serial No. PCT/US2020/044555 dated Oct. 27, 2020, 15 pages.

(Continued)

*Primary Examiner* — Khai M Nguyen

(74) *Attorney, Agent, or Firm* — Amin, Turocy & Watson, LLP

(57) ABSTRACT

In various aspects, a system that receives a first message, wherein the first message comprises a communication device identification and a feature tag having a language indication that indicates a language configuration of a user equipment. In response to the receiving the first message, storing the language indication and associating the language indication with the communication device identification. The system determines whether an incoming call is not authenticated and in response to the determining that the incoming call is not authenticated, transmitting a textual message to the communication device using the language configuration to indicate the incoming call is not authenticated.

37 Claims, 10 Drawing Sheets

(52) U.S. Cl.
CPC ............... *H04M 2203/2061* (2013.01); *H04M 2203/252* (2013.01); *H04M 2203/6027* (2013.01)

(56) References Cited

OTHER PUBLICATIONS

3GPP "3rd Generation Partnership Project; Technical Specification Group Services and System Aspects; IP Multimedia Core Network Sub system (IMS) Multimedia Telephony Service and supplementary services; Stage 1 (Release 16)", 3GPP Standard; Technical Specification; 3GPP TS 22.173, 3rd Generation Partnership Project (3GPP), Mobile Competence Centre ; 650, Route Des Lucioles ; F-06921 Sophia-Antipolis Cedex ; France, XP051754105, vol. SA WGI, No. V16.3.0, Jun. 14, 2019, 75 pages.

International Preliminary Report on Patentability received for PCT Application Serial No. PCT/US2020/044555 dated Mar. 3, 2021, 7 pages.

* cited by examiner

900

DISPLAYING A TEXTUAL MESSAGE BASED ON CONFIGURATION OF THE USER EQUIPMENT

CROSS-REFERENCE TO RELATED APPLICATIONS

This application claims priority to U.S. Provisional Patent Application Ser. No. 62/887,956 filed on Aug. 16, 2019, entitled "DISPLAYING A TEXTUAL MESSAGE BASED ON CONFIGURATION OF THE USER EQUIPMENT." The entirety of the aforementioned application is incorporated by reference herein.

TECHNICAL FIELD

This disclosure relates generally to displaying textual messages in a wireless communication system. More specifically, displaying of textual messages, received from a network, based on the language configuration of a communication device.

BACKGROUND

In a wireless communication system, when a user receives a call on their user equipment (UE), a textual information associated with the caller can be displayed on the user equipment. The textual information displayed can be a name associated with the caller identification. Occasionally, when a call from an unknown caller or a caller identified as a "scam"/"robo"/"fake" is received, the UE displays a textual message in indicating "unknown"/"scam"/"robo"/"fake" call. This alert the user not to pick up the phone to make a connection. Many times, these types of call are intended to extract money from using fake numbers or provide unsolicited advertisements (e.g., spam calls). In order to make the receiving party more informed of the authenticity of the call operators are now interested in checking the authenticity of a call and if they know it is a "fraud" call then informing the user via a textual string e.g. SPAM (See 3GPP TS 22.173 clause 4.7 [1]). However, the problem is that network does not know which language the receiving party understands or to which language the UE is configured for receiving textual messages from the network. In Switzerland there are 3 languages, French, German and Italian, where as a country like Zimbabwe has 16.

The above-described background on scam or spam calls is merely intended to provide a contextual overview of some current issues, and is not intended to be exhaustive (e.g., although problems and solution are directed to next generation networks such as 5G, the solutions can be applied to 4G/LTE technologies). Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
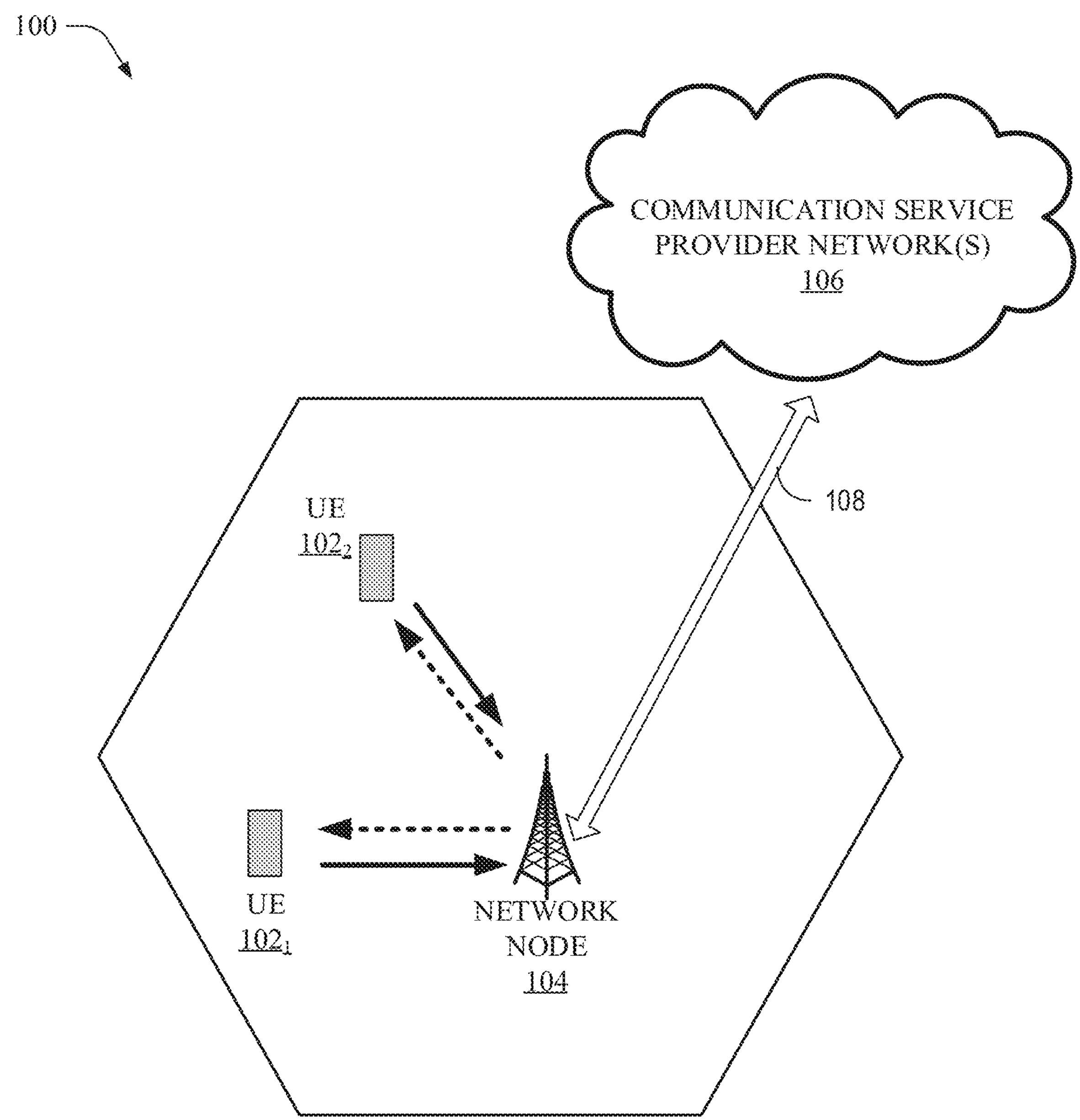
FIG. 1 illustrates an example wireless communication system in which a network node device and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various non-transitory machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words “exemplary” and/or “demonstrative” are used herein to mean serving as an example, instance, or illustration. For the avoidance of doubt, the subject matter disclosed herein is not limited by such examples. In addition, any aspect or design described herein as “exemplary” and/or “demonstrative” is not necessarily to be construed as preferred or advantageous over other aspects or designs, nor is it meant to preclude equivalent exemplary structures and techniques known to those of ordinary skill in the art. Furthermore, to the extent that the terms “includes,” “has,” “contains,” and other similar words are used in either the detailed description or the claims, such terms are intended to be inclusive—in a manner similar to the term “comprising” as an open transition word—without precluding any additional or other elements.

As used herein, the term “infer” or “inference” refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term “article of manufacture” as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate displaying of textual messages, received from a network, based on the language configuration of a communication device. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or other LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology, Satellite technologies etc. Additionally, substantially all aspects disclosed herein can be exploited in legacy telecommunication technologies.

Described herein are systems, methods, articles of manufacture, and other embodiments or implementations that can displaying of textual messages, received from a network, based on the language configuration of a communication device. Facilitating displaying of textual messages can be implemented in connection with any type of device with a connection to the communications network (e.g., a communication device, a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting terms such as user equipment (UE) or mobile equipment (ME) are used interchangeably to describe a communication device that operates in a communication network. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node device, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, evolved Node B (eNB or eNodeB), next generation Node B (gNB or gNodeB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller (e.g., controller, central controller, or centralized unit) that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

For brevity and simplicity, Table 1 describes abbreviations used to describe one or more aspect of the embodiments.

TABLE 1

| Abbreviations | |
|---|---|
| AMF | Access Management Function |
| AS | Application Server |
| EQID | Equipment ID |
| GERAN | GSM/EDGE Radio Access Network |
| GRUU | Global Routable UA URI |
| HLR | Home Location Register |
| HSS | Home Subscriber Server |
| LTE | Long Term Evolution |
| IARI | IMS Application Reference Identifier |
| I-CSCF | Interrogating Call Session Control Function |
| ICSI | IMSI Communication Service Identifier |
| IMEI | International Mobile Equipment Identity |
| IMS | IP Multi-Media Subsystem |
| ME | Mobile Equipment |
| MMI | Man Machine Interface |
| MSISDN | Mobile Station ISDN |
| MUD | Multi Device and Multi Identity |
| NAS | Non Access Stratum |
| NG | Next Generation |
| PCF | Policy Control Function |
| P-CSCF | Proxy Call Session Control Function |
| PTMSI | Packet Temporary Mobile Subscriber Identity |
| PUI | Public User Identity |
| RAT | Radio Access Technology |
| S-CSCF | Serving Call Session Control Function |
| SUCI | Subscriber Concealed Identifier |
| TMSI | Temporary Mobile Subscriber Identity |
| UDM | Unified Data Management |
| UE | User Equipment |
| USSD | Unstructured Supplementary Service Data |
| UTRAN | UMTS Terrestrial Radio Access Network |
| WLAN | Wireless LAN |

An IMS is framework developed by 3GPP. It allows an operator to deploy numerous different services. It is used to provide Voice over LTE (VoLTE) and will also be used to provide voice over a 5G network. The basic architecture consists of: P-CSCF Proxy Call Session Control Function is first point of contact with the IMS subsystem from the UE. Maintains security association with the UE and performs policing of messages and other policy functions; S-CSCF maintains session state, performs the registrar functions defined in RF 3261 [xx] and determines which AS to involve in a session; I-CSCF is the contact point for terminating connections to a user. It queries HSS to see which S-CSCF the user is hosted on. For UE registration it is involved in assigning S-CSCF for the user; and AS executes the services in the IMS network wherein some AS in a Service Continuity Control AS determines how to route terminating calls. This routing function is called Terminating Access Domain Selection (TADS). The IMS is based on SIP and as such uses SIP METHODS. Error! Reference source not found. provides an overview of SIP methods. In the context of this description, the SIP message names are used however the term SIP METHOD could equally be used.

The SIP, a textual language, uses methods/requests and corresponding responses to communicate and establish a call session. Example of SIP request can be described in table below.

TABLE 2

| Example of SIP Requests |
|---|
| INVITE = Establishes a session. |
| ACK = Confirms an INVITE request. |
| BYE = Ends a session. |
| CANCEL = Cancels establishing of a session. |
| REGISTER = Communicates user location (host name, IP). |
| OPTIONS = Communicates information about the capabilities |

TABLE 2-continued

| Example of SIP Requests |
| --- |
| of the calling and receiving SIP phones. |
| PRACK = Provisional Acknowledgement. |
| SUBSCRIBE = Subscribes for Notification from the notifier. |
| NOTIFY = Notifies the subscriber of a new event. |
| PUBLISH = Publishes an event to the Server. |
| INFO = Sends midsession information. |
| REFER = Asks the recipient to issue call transfer. |
| MESSAGE = Transports Instant Messages. |
| UPDATE = Modifies the state of a session |

To establish a connection, A SIP user agent will first register with the system. Once registered, other SIP methods can be used. For example, a SIP INVITE that sets up a SIP session.

Below provides a list of terms and definition used to describe various aspects of one or more embodiments. One will appreciate that there could be further definitions for the term not used. In some aspects, of implementation, information can be conveyed as: feature tags, new SIP header, SIP parameter or URI parameter in a new or existing information element or encoded using XML or JSON.

Identity, UE or ME identity, may be defined as Public user ID, Private user ID (PUI), Equipment identification (ID), or the like. Identity Set may be defined as containing one or more Identity, PUI, Private User ID, or equipment identification ID. The Identity set may contain multiples of same identity. The PUI may be defined as MSISDN, Tel URI or SIP URI, the Private user ID may be defined as IMSI, SUCI, TMSI, PTMSI, Tel URI, SIP URI, or the like. The Equipment ID (EQID) may be defined as IMEI, MAC, Bluetooth MAC, Identification of the equipment or hardware, SIP instance ID, SIP parameter, GRUU, Temp GRUU or the like. The UE, also interchangeably referred to as ME, may receive data (e.g., voice, video, messaging, etc.) and/or allow indications (e.g., first indication and/or second indication to sent to first function of a second type). For example, UE may be a wireless device (UE, ME), set-top box, Laptop, drone, car, wearable (e.g. watch, glass's, headset, hearing aid, monitoring device etc), home automation device (smart bulb, smart socket, thermostat etc.). In some embodiments, wireless device may comprise radio access technologies or fixed access technologies. Radio access technology can comprise GERAN, UTRAN, E-UTRAN, NG, Bluetooth, WLAN, WiMax, Satellite, LTE-PC5, MR-PC5, Device-2-Device, Z-Wave, Zigbee DSRC, etc. The fixed access technology may comprise ethernet, HomePNA, MoCA, HomePNA, HomePlug etc. A first network node (NN) 1 may comprise S-SCCF, AMF, AS, UPF, P-GW, UDM, HSS and the like. The UDM may be known as HLR, HSS and may comprise, a UDR. The UDM is a database function that may be, but not limited to, subscription data, location data, setting or configuration data or provides authentication vectors (the function also supports authentication vector generation and it can also generate the vectors as well as provide them). A second NN (e.g, NN2) may be AS, SMSF, SMC-SC. A third NN (e.g., NN3) may be AMF or MME. One or more messages may be utilized to register a device with the NN. For example, message #1 can comprise Register (e.g., IMS), Register (e.g., NAS), Attach, Mobility Management Update, or UL NAS Transport details; and message #2 can comprise NUDM_SDM_INFO request or Update location request. The mobility management update may comprise location update, routing area update, tracking area route or registration request.

According to an embodiment, a system can comprise a processor and a memory that stores executable instructions that, when executed by the processor, facilitate performance of operations comprising requesting a positioning measurement data set from one or more network node devices. The system can further comprise receiving a first message, wherein the first message comprises a network communication device identification and a feature tag having a language indication that indicates a language configuration of the network communication device, in response to the receiving the first message, storing the language indication and associating the language indication with the network communication device identification, determining whether an incoming call is not authenticated, and in response to the determining that the incoming call is not authenticated, transmitting a textual message to the network communication device using the language configuration to indicate the incoming call is not authenticated.

According to another embodiment, described herein is a method that can comprise receiving, by a processor of a device, a first message, wherein the first message comprises a network communication device identification and a feature tag having a language indication that indicates a language configuration of the network communication device. The method can further comprise in response to the receiving the first message, storing, by the device, the language indication and associating the language indication with the network communication device identification, determining, by the device, whether an incoming call is not authenticated, and in response to the determining that the incoming call is not authenticated, transmitting, by the device, a textual message to the network communication device using the language configuration to indicate the incoming call is not authenticated.

According to yet another embodiment, a device can comprise a processor and a memory that stores executable instructions that, when executed by the processor, facilitate performance of operations comprising requesting a positioning measurement data set from one or more network node devices. The device can further comprise receiving a first message, wherein the first message comprises a network communication device identification and a feature tag having a language indication that indicates a language configuration of the network communication device, in response to the receiving the first message, storing the language indication and associating the language indication with the network communication device identification, determining whether an incoming call is not authenticated, and in response to the determining that the incoming call is not authenticated, transmitting a textual message to the network communication device using the language configuration to indicate the incoming call is not authenticated.

These and other embodiments or implementations are described in more detail below with reference to the drawings. Repetitive description of like elements employed in the figures and other embodiments described herein is omitted for sake of brevity.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, set-top box, voice assistant, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosure, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or include a large-scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these 9 Wave signals experience severe path loss, penetration loss, and fading. However, the shorter wavelength at 9 Wave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve 9Wave communications and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are planned for use in 5G systems.

In LTE, LTE-5G or LTE new radio (NR), to locate a UE geographically, there are several approaches network or UE can utilize. One is to use some form of terrestrial radio location based on measurements made by a UE of signals transmitted by wireless network base stations and/or based on measurements made by network elements (e.g., base stations) of signals transmitted by the UE. Another approach is to use a Global Positioning System (GPS) receiver or Global Navigation Satellite System (GNSS) receiver built into the UE itself.

Figure 2:
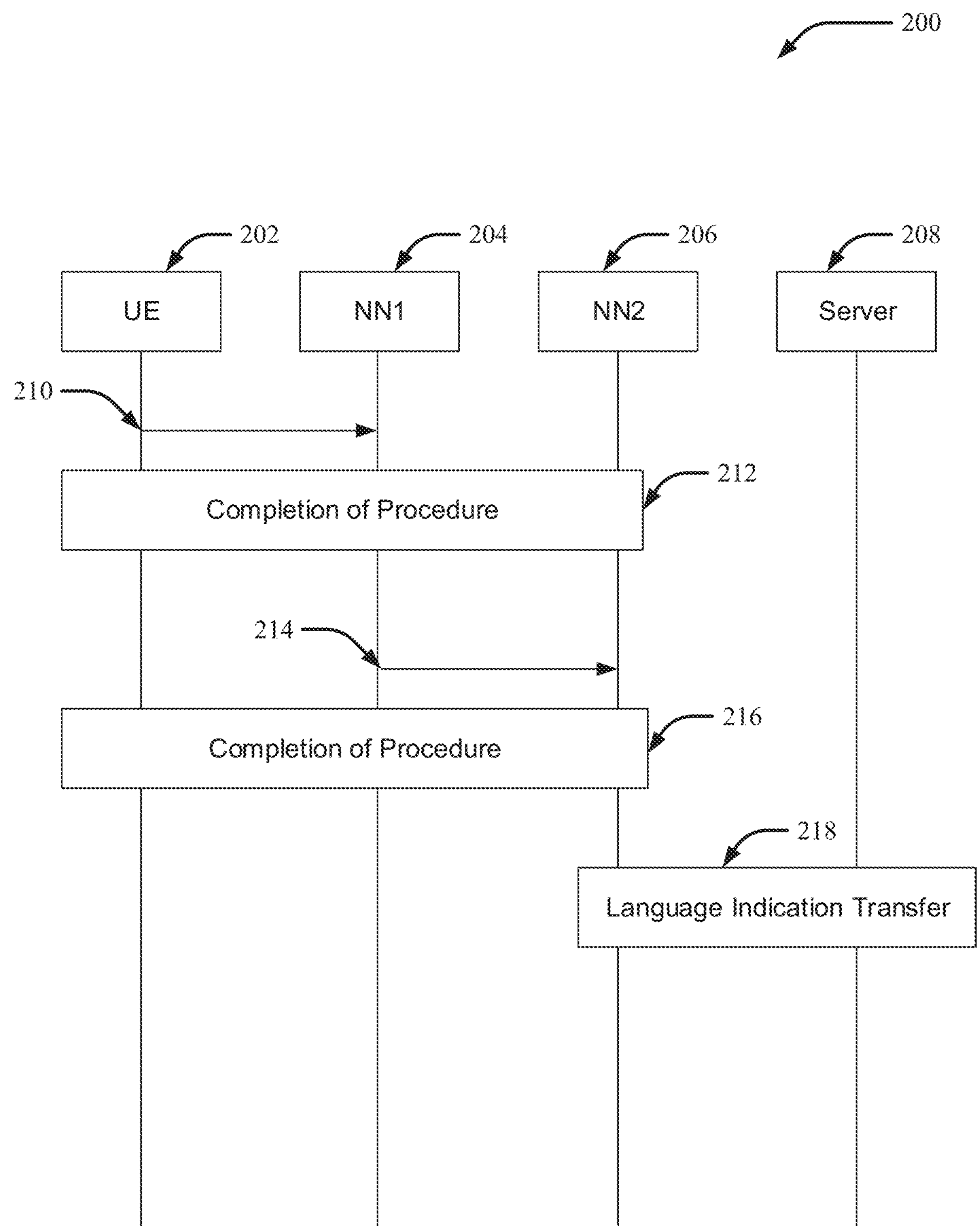
FIG. 2 illustrates a non-limiting example of information flow between one or more devices communicatively operating in a wireless communication system in accordance with one or more embodiments.

FIG. 2 illustrates a non-limiting example of information flow 200 between one or more devices communicatively operating in a wireless communication system in accordance with one or more embodiments. In non-limiting example embodiment, The UE 202 sends a message #1 210 to the Network Node 1 (NN1) 204 containing a language indication. Indication could be written language or a numerical value that represents a specific language. The language indication could be encoded as ISO 639-1/2 code which are either 3 or 2 alphanumeric characters. If message #1 was e.g. a SIP REGISTRATION message, then at 212, the registration procedure is completed using the information received in message #1 210. The NN1 204 then sends the language indication to NN2 206 using message #3 214. The sending is either transparently (e.g., not modified or transmitting message #1 without reformatting or altering) sending the received information or reformatting the received information and sending it in another form. In an embodiment, the NN2 could perform the same action as NN1 and transmits the message to a server 208. In some embodiments, NN2 could be a short message service center (SMS-C), an application server (AS), a network exposure function (NEF) or a service capability exposure function (SCEF). At 216, the registration procedure is completed using the information received in message #3 214. These functions or the language indication transfer 218 could either perform a query function to obtain the language indication or it could be pushed to them. For example, the server 208 could use the interface to query the NN2 to obtain the language indicator. The AS could provide an identity (pubic user identity (PUI), Global Routable UA URI (GRUU) etc.) sent to the NN2 and the NN2 sends back language indicator.

In some embodiments, the language indication can be coded according to ISO-639-1 and/or ISO-639-2, herein incorporated by reference. The language indication can be a number of string. For example, but not limited to, English (0), French (1), German (12), Spanish (13), Chinese (14), Japanese (15), S. Korean (16) MSISDN (17) or unknown (0).

Figure 3:
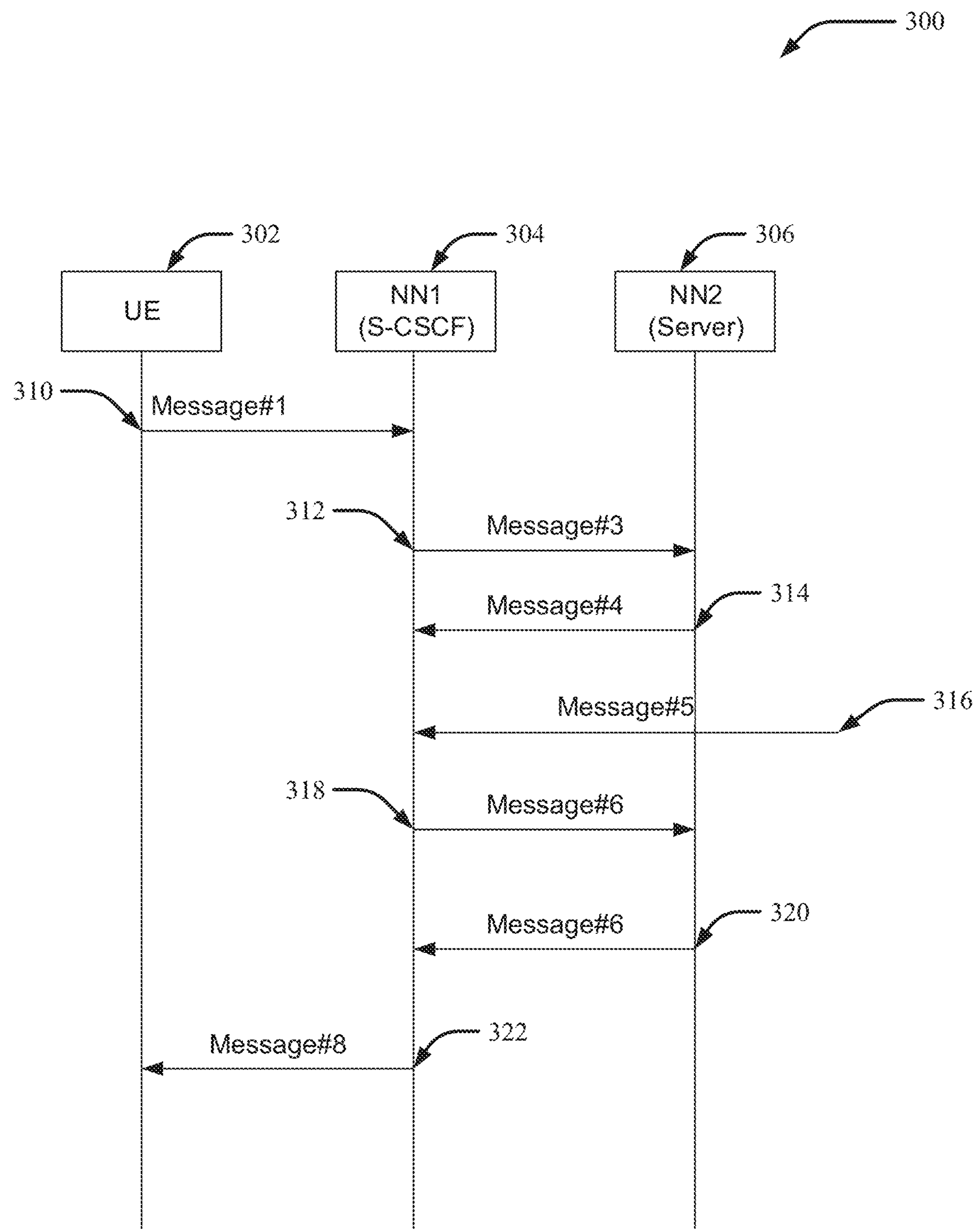
FIG. 3 illustrates a non-limiting example of information flow between one or more devices communicatively operating in a wireless communication system in accordance with one or more embodiments.

FIG. 3 illustrates a non-limiting example of information flow 300 between one or more devices communicatively operating in a wireless communication system in accordance with one or more embodiments. At 310, a UE 302 transmits a message #1 (e.g., first message or registration message) to S-CSCF to establish a call session, which a communication link between two devices for exchanging verbal, visual or textual communication. In some embodiments, the first message can comprise, at least but not limited to, an indication that conveys language of the UE. For example, the UE 302 conveys to S-CSCF (e.g., NN2) the language setup to receives textual, visual or audio information. For example, message #1 can comprise a language indicator that can notify the network node the language configuration of the UE. The language indicator can be textual value (e.g., Japanese), numerical value (e.g., 11 for Japan) or encoded as ISO-639-1 or ISO-639-2. These later 2 specifications encode the language using 2 or 3 alphanumeric characters. The language indication could be the language setting used for the MMI. Language indication could be a feature tag that identifies the language. The language could be either in textual format (e.g. Chinese, English, French etc.) or it could be a numerical identifier (e.g. 1=Chinese, 2=English, 3=French etc.).

In some embodiments, the feature tag (also referred to as media feature tag) is defined as g.3gpp.languagetype. One will appreciate that the term g.3gpp.languagetype is used for illustrative purposes and the feature tag could be any construct of alphanumeric characters. As an example, the feature tag when used in a SIP REGISTER request, the feature tag indicates setting used by the device and the particular registration flow that the device is using to register over. The exemplary values used with this feature tag can be in form of a textual string. For example, string value "English" to indicate that the UE or ME is configured for English or string value "Chinese" to indicate that the UE or ME is configured for Chinese. In some embodiments, the string value may a numeric value. For example, string value "1" to indicate that the UE or ME is configured for English or string value "2" to indicate that the UE or ME is configured for Chinese. In some embodiments, the string value may a combination of textual and numerical value. For example, string value "English1" to indicate that the UE or ME is configured for English or string value "Chinese2" to indicate that the UE or ME is configured for Chinese. The example using English and Chinese is intended to illustrate how feature tag can be used to convey language configuration of a device (e.g., UE or ME) and is not exhaustive. The language configure of a device can be for all the available languages, wherein similar method can be used to convey the language configuration to the network node or any other device that tracks language configuration of devices connected to the network. The feature-tag is intended primarily for use in the following applications, protocols, services, or negotiation mechanisms: This feature-tag is most useful in a communications application, for describing the capabilities of a device, such as a phone or PDA. In some embodiments, the message #1 310 is received by the NN (e.g., S-CSCF 304) and processed.

In some embodiments, upon completion of processing the message #1 310, the NN transmits a message #3 to a server 306 (e.g., the NN3 or the AS). The message #3 312 may comprise the language indication received from the message #1 310. The message #3 312 may be, but not limited to, a third-party registration containing part of the message #1 310. The message #3 312 may also comprise zero or more public user identities. In response to receiving the message #3 312 by the server 306, the server 306 stores the language setting using the identity (e.g. provided in message #1 and/or message #3, where the identity can be for UE identity, private identity or public user identity). In response to completing processing message #3 312, the server 306 transmits an acknowledgement (e.g., 200OK) 314 to S-CSCF 304.

In some embodiments, an external server (not shown in the diagram) may transmit message #5 316 (e.g., an INVITE message) comprising a textual string to the S-CSCF 304. In response, the S-CSCF 304 may transmit message #6 318, wherein the message #6 318 may comprise partial or all content of message #5.

In response to receiving message #6 318, the NN2 304 can compare the data received against a set of rules and/or policies configured in the network node. Table 3 below illustrates example of how polices could be constructed.

TABLE 3

Example Policy configuration

| Parameter | Parameter Contents | Language setting | Replacement/ Action to perform |
|---|---|---|---|
| A | ABC | 1 | WXY |
| | | 2 | GHY |
| | DEF | 1 | KLI |
| | | 2 | HJY |
| B | Empty | 1 | WXY |
| C | Empty | * | |

In an embodiment, the parameter may be a SIP header, URI parameter, header parameter, XML parameter, etc. The parameter contents can be either full or partial match. The "*" indicates a partial match. The parameter content may be empty, which indicates if the parameter is present, then perform the action. The language setting indicates the language used for performing the action associated with parameter content. The "*" indicates perform action using any language. The replacement setting identifies the replacement text. A blank indicates no changes received. The entries illustrated in the Table 3 (e.g., "ABC" to "WXY") are for illustration purposes only. Furthermore, any other character may be used instead of the "*" to perform the function of "*", for example "**" may used to illustrate partial match.

Below describes possible SIP headers that the polices could be applied to are, but not limited: From, Diversion, P-Asserted Identity, Contact etc.

TABLE 4

Example Message#6

```
From: Alice <sip:alice@atlanta.example.com>;tag=9fxced76sl
To: Bob <sip:bob@biloxi.example.com>
Call-ID: 3848276298220188511@atlanta.example.com
CSeq: 2 INVITE
Contact: <sip:alice@client.atlanta.example.com;transport=tcp>
Diversion: Carol <sip:carol@atlanta.example.com>;privacy=off;reason=no-
answer;counter=1;screen=no
Remote-Party-ID: Alice <sip:alice@atlanta.example.com>
P-Asserted-Identity: Alice <sip:alice@atlanta.example.com>
```

In some embodiments, the message can indicate that an incoming call or request to establish a communication link is from an authenticated source (e.g., a SPAM call, a call from unknown source that has blocked the caller identity or a known marketing caller). Table 5 illustrates the SIP header illustrating the SPAM call.

TABLE 5

| Example Message |
|---|
| From: SPAM <sip:alice@atlanta.example.com>;tag=9fxced76sl<br>To: Bob <sip:bob@biloxi.example.com><br>Call-ID: 3848276298220188511@atlanta.example.com<br>CSeq: 2 INVITE<br>Contact: <sip:alice@client.atlanta.example.com;transport=tcp><br>Diversion: SPAM <sip:carol@atlanta.example.com>;privacy=off;reason=no-answer;counter=1;screen=no<br>Remote-Party-ID: SPAM <sip:alice@atlanta.example.com><br>P-Asserted-Identity: SPAM <sip:alice@atlanta.example.com> |

The SPAM value can change based on how the policy is applied.

As illustrated, From, Diversion, Remote-Party-ID and P-Asserted-Identity have had the text "Carol" replaced with "SPAM". In this example, Atlanta.example.com matched in the headers and language setting was English, so the replacement text was SPAM. If the language setting was Hindi, then the replacement text could be "स्पैम" (e.g, Hindi display indicating SPAM). The replacement text is associated with language setting.

In an embodiment, a second type of policy is that the incoming Message #6 may or may not contain some textual data. The 2$^{nd}$ Network node either internal, or by querying a database or 3$^{rd}$ network node determines if Message #6 is from a trusted source. If the source (e.g. one of more of the headings: From, Diversion, Remote-Party-ID and P-Asserted-Identity etc) cannot be trusted the Network Node uses the language setting to determine what textual string should be inserted. For example, incoming session (e.g., incoming call) from +6195551212 is determined to be from an untrusted source (e.g., not authenticated). Here, the language setting is 1 (e.g., English), thus the replace or add text that indicates a SPAM call. In another example, the incoming session is from P-Asserted-Identity: <sip.bob@friendy.com> and it is determined that session is from an untrusted source. The system will check the language setting, which in example is set to 1. Thus, the system will replace or add text that indicates the incoming session is SPAM and P-Asserted-Identity: SPAM <sip.bob@friendy.com>. In this example, the text SPAM was added to P-Asserted-Identity. Trust is determined by an algorithm either in the Network Node or another external network node. What is key is if the message #6 is considered to be not trustable, or from an unauthenticated source the policy in Table 3 is executed.

The NN1 transmits the message #8 322 to UE comprising a second string (e.g., textual string in language B) that is based upon the applied policy. In response to receiving message #8 322, the UE can display (textually, via audio or video based on language configuration provided or set for the UE) the textual string.

In some embodiments, the UE sends a message to the network containing an indication of language configuration of the UE, wherein the language is the language of the MMI and a feature tag is utilized to signal the language configuration of UE (e.g., feature tag comprising a language indication). The feature tag comprises a language indication either in textual format or conveyed by value that indicates language or both (e.g., English, 1 or English1). The message transmitted may be SIP REGISTER or SIP INVITE or the like. In response to receiving the message by the network node, the network node stores the received language indication. During the operation of communication, a second message may be received at the network node, wherein the second message may contain zero or more textual strings. If the message contains a textual string, the textual string is compared against the rule in the network node. If the textual string matches the rule and matches a rule using the language indication, then the textual string should be modified. For example, displaying the textual message (e.g., SPAM) according to the language indication. The displaying may be audio, visual, video, or textual display.

Figure 4:
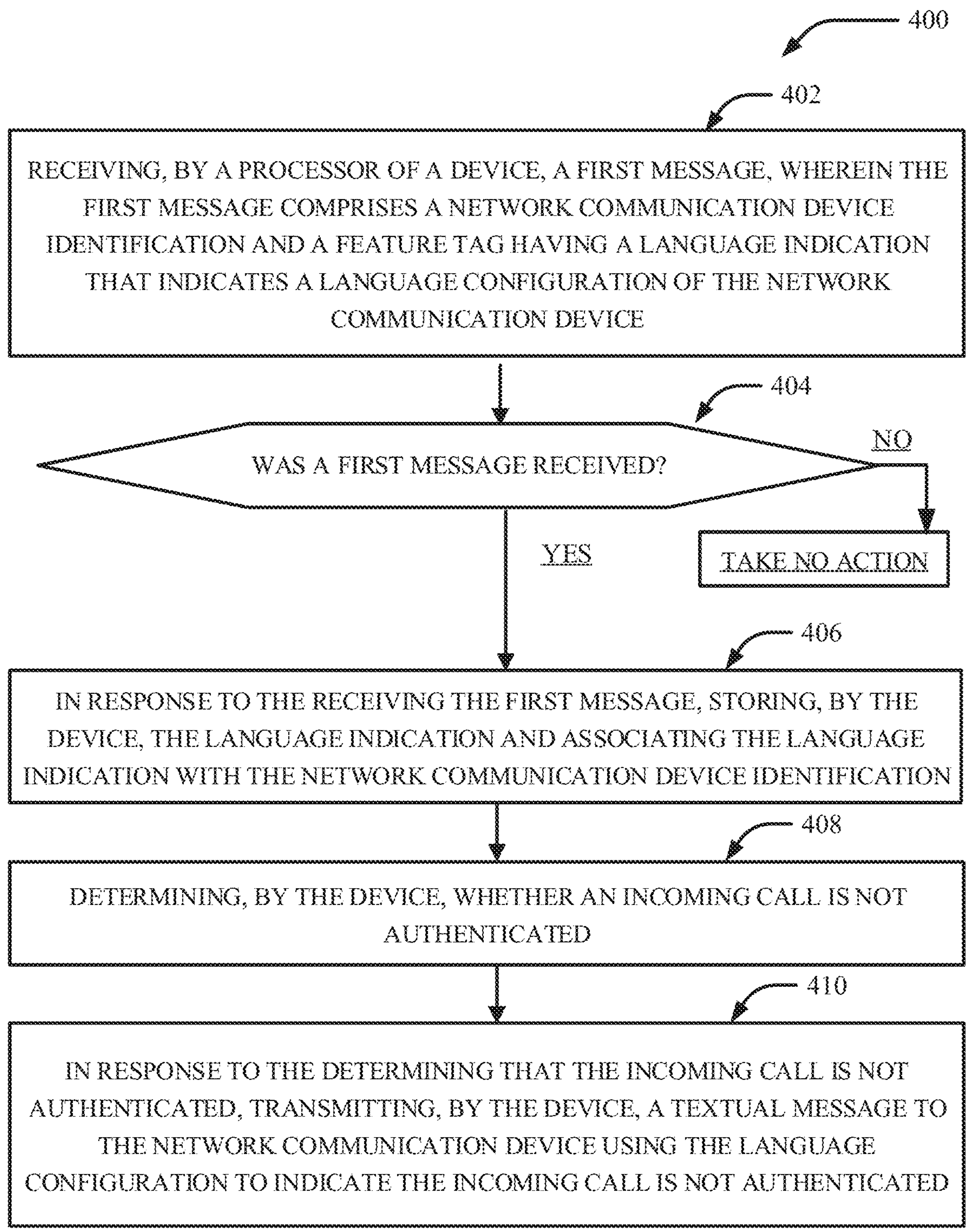
FIG. 4 depicts a diagram of an example, non-limiting computer implemented method that facilitates displaying of textual messages, received from a network, based on the language configuration of a communication device in accordance with one or more embodiments described herein.

FIG. 4 depicts a diagram of an example, non-limiting computer implemented method that facilitates displaying of textual messages, received from a network, based on the language configuration of a communication device in accordance with one or more embodiments described herein. In some examples, flow diagram 400 can be implemented by operating environment 1000 described below. It can be appreciated that the operations of flow diagram 400 can be implemented in a different order than is depicted.

In non-limiting example embodiments, a computing device (or system) (e.g., computer 1004) is provided, the device or system comprising one or more processors and one or more memories that stores executable instructions that, when executed by the one or more processors, can facilitate performance of the operations as described herein, including the non-limiting methods as illustrated in the flow diagrams of FIG. 4.

Operation 402 depicts receiving, by a processor of a device, a first message (e.g. SIP REGISTRATION, 5G NAS REGISTRATION, SIP METHOD), wherein the first message comprises a network communication device identification (e.g., UE identity) and a feature tag (e.g., an indication) having a language indication that indicates a language configuration of the network communication device. Operation 404 depicts, by the device, determining if a first message was received and properly decoded. If the first message was received and properly decoded, then perform operation 408. Otherwise, take no action and continue monitoring. Operation 406 depicts in response to the receiving the first message, storing, by the device, the language indication and associating the language indication with the network communication device identification. Operation 408 depicts determining, by the device, whether an incoming call (e.g., message e.g. SIP Method, session request etc.) is not authenticated, not authenticated meaning that an operation has been performed to determine if the source of the message is from a trustable source. Trustable source could have been determined by analysis of the message, the message contents, setting or contents of headers etc or containing a certificate from an authorized source. In general a 2$^{nd}$ policy function has been performed and determined that the message is from an unauthenticated source. Operation 410 depicts in response to the determining that the incoming call is not authenticated, transmitting, by the device, a textual message to the network communication device using the language configuration to indicate the incoming call is not authenticated.

Figure 5:
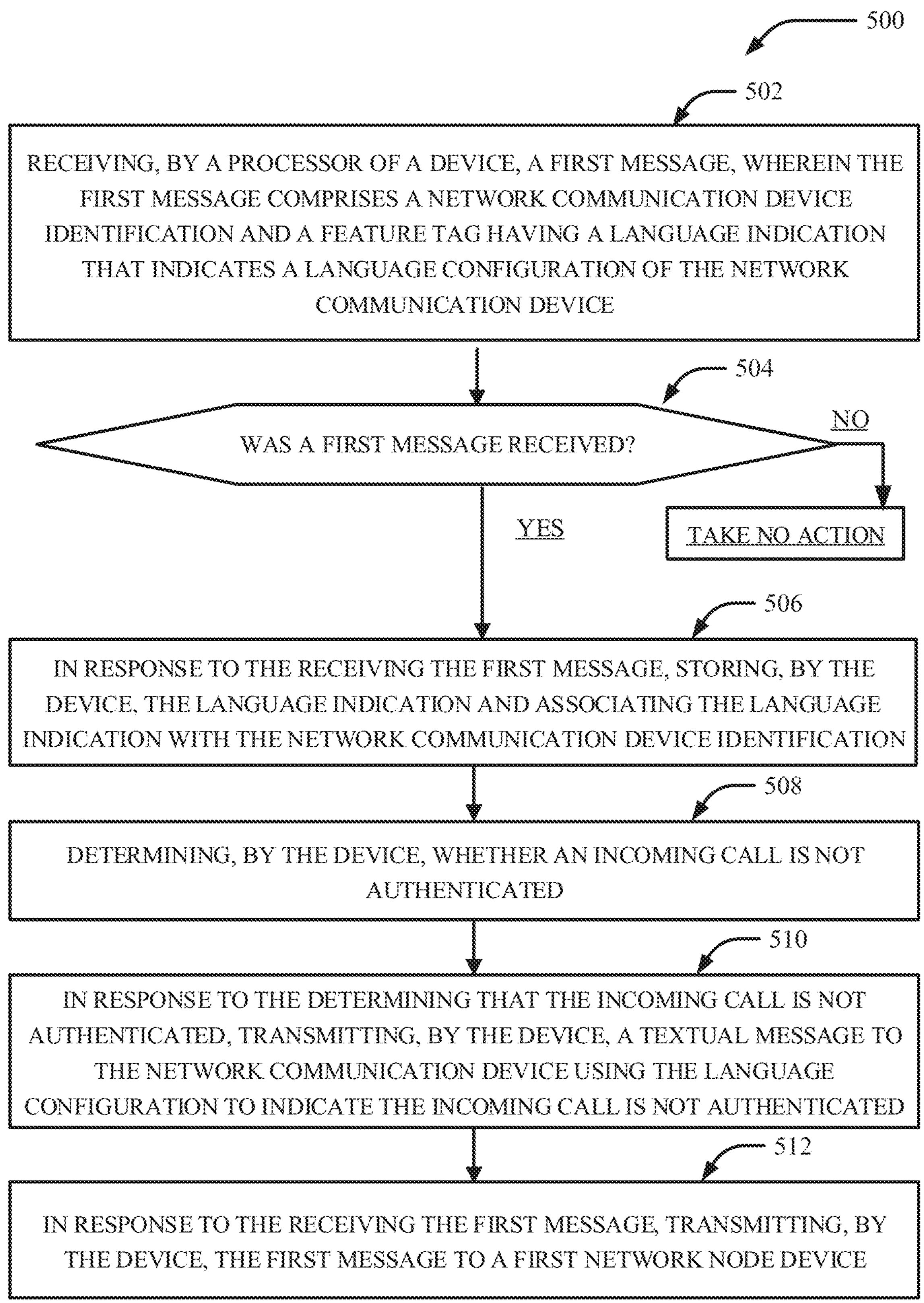
FIG. 5 depicts a diagram of an example, non-limiting computer implemented method that facilitates displaying of textual messages, received from a network, based on the language configuration of a communication device in accordance with one or more embodiments described herein.

FIG. 5 depicts a diagram of an example, non-limiting computer implemented method that facilitates displaying of textual messages, received from a network, based on the language configuration of a communication device in accordance with one or more embodiments described herein. In some examples, flow diagram 500 can be implemented by operating environment 1000 described below. It can be appreciated that the operations of flow diagram 500 can be implemented in a different order than is depicted.

In non-limiting example embodiments, a computing device (or system) (e.g., computer 1004) is provided, the device or system comprising one or more processors and one or more memories that stores executable instructions that, when executed by the one or more processors, can facilitate performance of the operations as described herein, including the non-limiting methods as illustrated in the flow diagrams of FIG. 5.

Operation 502 depicts receiving, by a processor of a device, a first message, wherein the first message comprises a network communication device identification and a feature tag having a language indication that indicates a language configuration of the network communication device. Operation 504 depicts, by the device, determining if a first message was received and properly decoded. If the first message was received and properly decoded, then perform operation 508. Otherwise, take no action and continue monitoring. Operation 506 depicts in response to the receiving the first message, storing, by the device, the language indication and associating the language indication with the network communication device identification. Operation 508 depicts determining, by the device, whether an incoming call is not authenticated. Operation 510 depicts in response to the determining that the incoming call is not authenticated, transmitting, by the device, a textual message to the network communication device using the language configuration to indicate the incoming call is not authenticated. Operation 512 depicts in response to the receiving the first message, transmitting, by the device, the first message to a first network node device.

Figure 6:
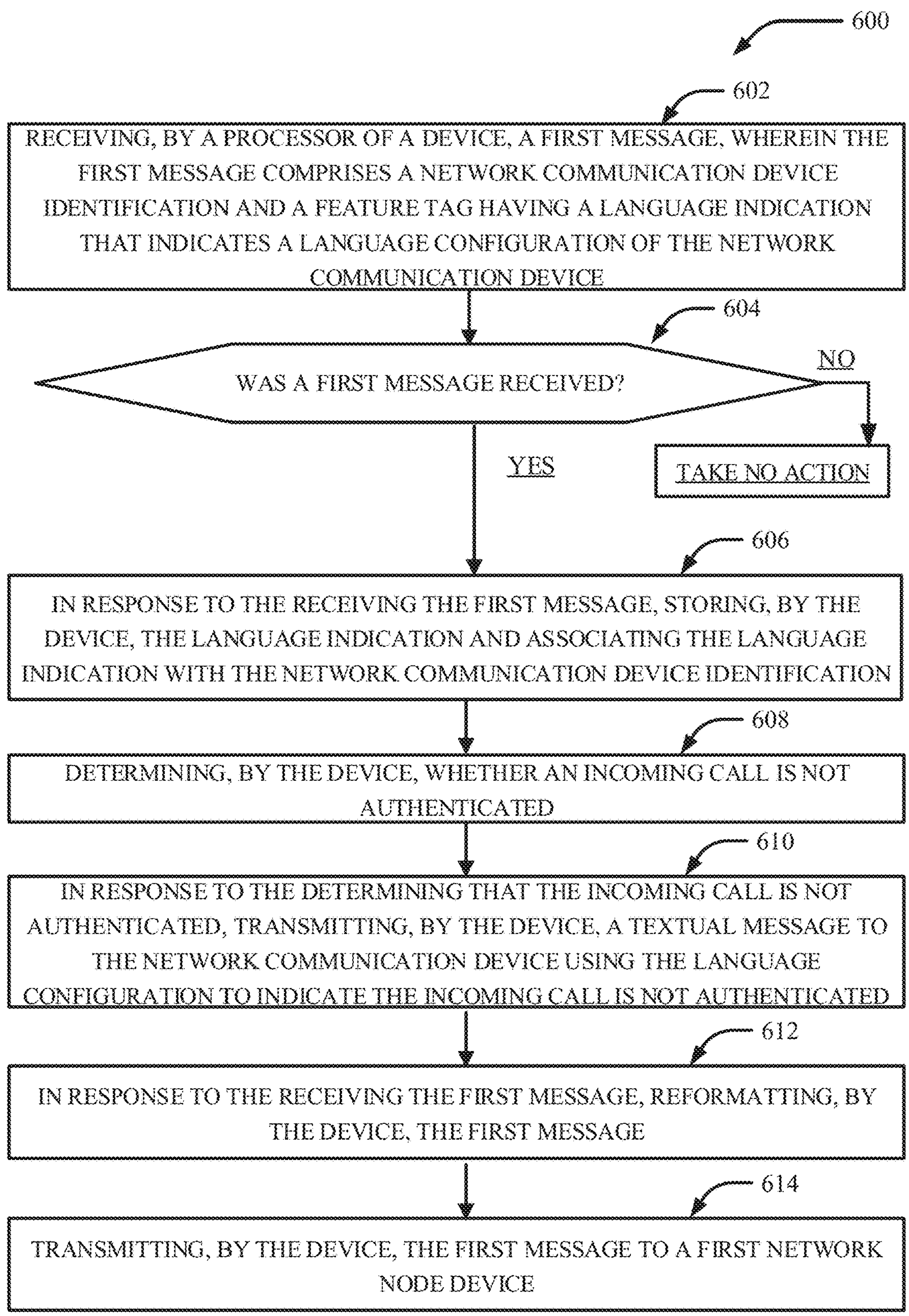
FIG. 6 depicts a diagram of an example, non-limiting computer implemented method that facilitates displaying of textual messages, received from a network, based on the language configuration of a communication device in accordance with one or more embodiments described herein.

FIG. 6 depicts a diagram of an example, non-limiting computer implemented method that facilitates displaying of textual messages, received from a network, based on the language configuration of a communication device in accordance with one or more embodiments described herein. In some examples, flow diagram 600 can be implemented by operating environment 1000 described below. It can be appreciated that the operations of flow diagram 600 can be implemented in a different order than is depicted.

In non-limiting example embodiments, a computing device (or system) (e.g., computer 1004) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts receiving, by a processor of a device, a first message, wherein the first message comprises a network communication device identification and a feature tag having a language indication that indicates a language configuration of the network communication device. Operation 604 depicts, by the device, determining if a first message was received and properly decoded. If the first message was received and properly decoded, then perform operation 608. Otherwise, take no action and continue monitoring. Operation 606 depicts in response to the receiving the first message, storing, by the device, the language indication and associating the language indication with the network communication device identification. Operation 608 depicts determining, by the device, whether an incoming call is not authenticated. Operation 610 depicts in response to the determining that the incoming call is not authenticated, transmitting, by the device, a textual message to the network communication device using the language configuration to indicate the incoming call is not authenticated. Operation 612 depicts in response to the receiving the first message, reformatting, by the device, the first message. Operation 614 depicts transmitting the first message to a first network node device.

Figure 7:
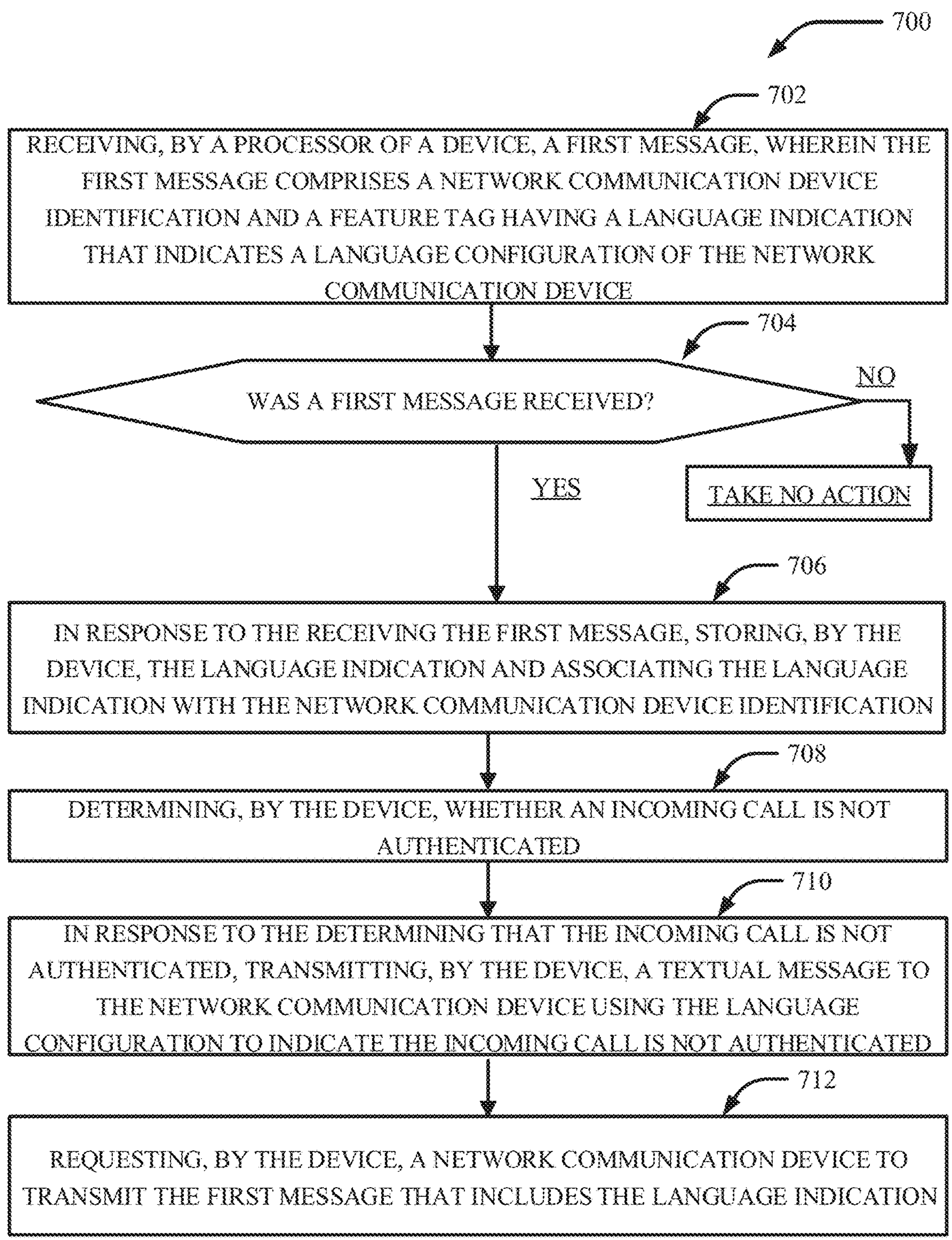
FIG. 7 depicts a diagram of an example, non-limiting computer implemented method that facilitates displaying of textual messages, received from a network, based on the language configuration of a communication device in accordance with one or more embodiments described herein.

FIG. 7 depicts a diagram of an example, non-limiting computer implemented method that facilitates displaying of textual messages, received from a network, based on the language configuration of a communication device in accordance with one or more embodiments described herein. In some examples, flow diagram 700 can be implemented by operating environment 1000 described below. It can be appreciated that the operations of flow diagram 700 can be implemented in a different order than is depicted.

In non-limiting example embodiments, a computing device (or system) (e.g., computer 1004) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts receiving, by a processor of a device, a first message, wherein the first message comprises a network communication device identification and a feature tag having a language indication that indicates a language configuration of the network communication device. Operation 704 depicts, by the device, determining if a first message was received and properly decoded. If the first message was received and properly decoded, then perform operation 708. Otherwise, take no action and continue monitoring. Operation 706 depicts in response to the receiving the first message, storing, by the device, the language indication and associating the language indication with the network communication device identification. Operation 708 depicts determining, by the device, whether an incoming call is not authenticated. Operation 710 depicts in response to the determining that the incoming call is not authenticated, transmitting, by the device, a textual message to the network communication device using the language configuration to indicate the incoming call is not authenticated. Operation 712 depicts requesting, by the device, a network communication device to transmit the first message that includes the language indication.

Figure 8:
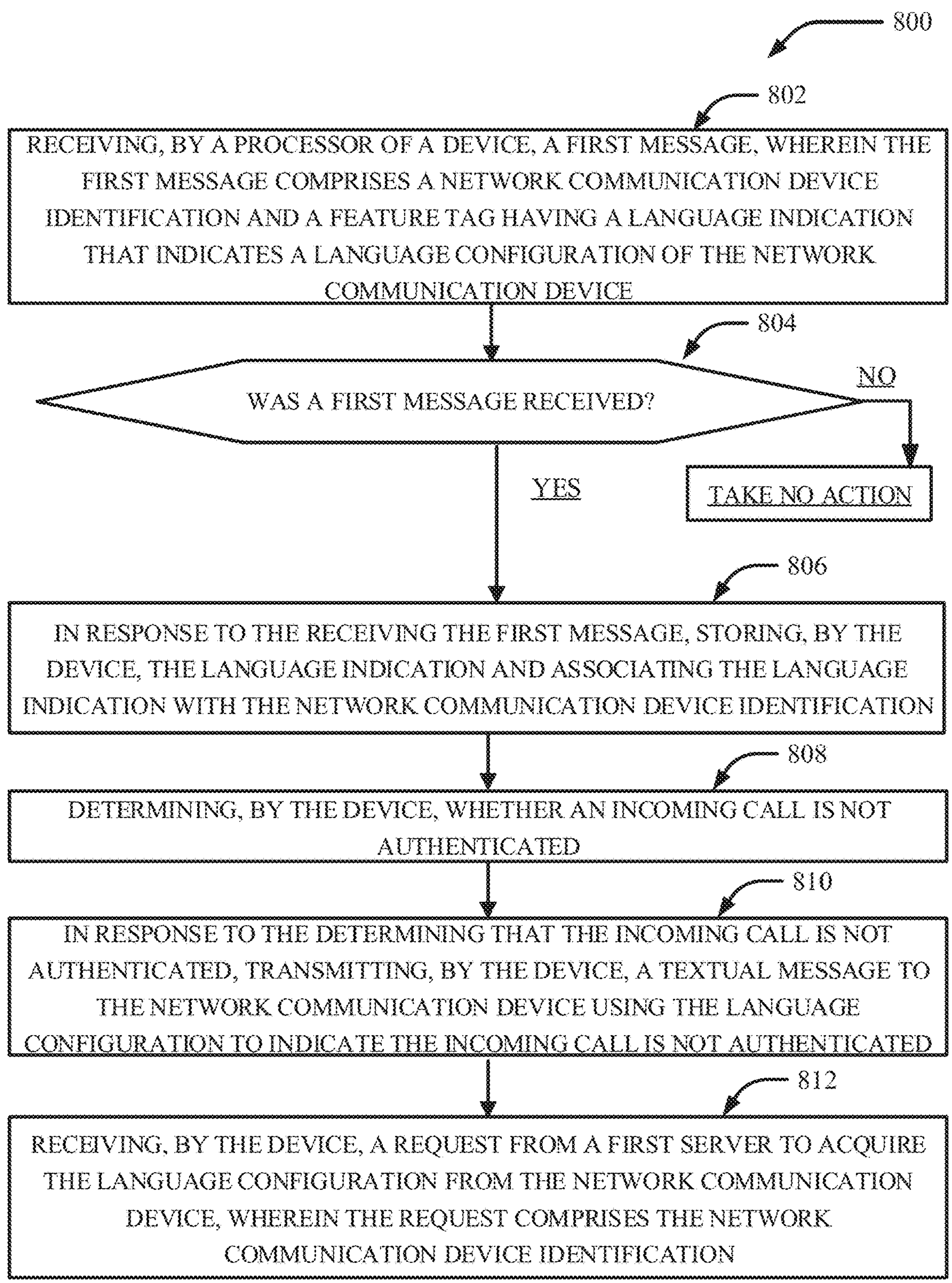
FIG. 8 depicts a diagram of an example, non-limiting computer implemented method that facilitates displaying of textual messages, received from a network, based on the language configuration of a communication device in accordance with one or more embodiments described herein.

FIG. 8 depicts a diagram of an example, non-limiting computer implemented method that facilitates displaying of textual messages, received from a network, based on the language configuration of a communication device in accordance with one or more embodiments described herein. In some examples, flow diagram 800 can be implemented by operating environment 1000 described below. It can be appreciated that the operations of flow diagram 800 can be implemented in a different order than is depicted.

In non-limiting example embodiments, a computing device (or system) (e.g., computer 1004) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts receiving, by a processor of a device, a first message, wherein the first message comprises a network communication device identification and a feature tag having a language indication that indicates a language configuration of the network communication device. Operation 804 depicts, by the device, determining if a first message was received and properly decoded. If the first message was received and properly decoded, then perform operation 808. Otherwise, take no action and continue monitoring. Operation 806 depicts in response to the receiving the first message, storing, by the device, the language indication and associating the language indication with the network communication device identification. Operation 808 depicts determining, by the device, whether an incoming call is not authenticated. Operation 810 depicts in response to the determining that the incoming call is not authenticated, transmitting, by the device, a textual message to the network communication device using the language configuration to indicate the incoming call is not authenticated. Operation 812 depicts receiving a request from a first server to acquire the language configuration from the network communication device, wherein the request comprises the network communication device identification.

Figure 9:
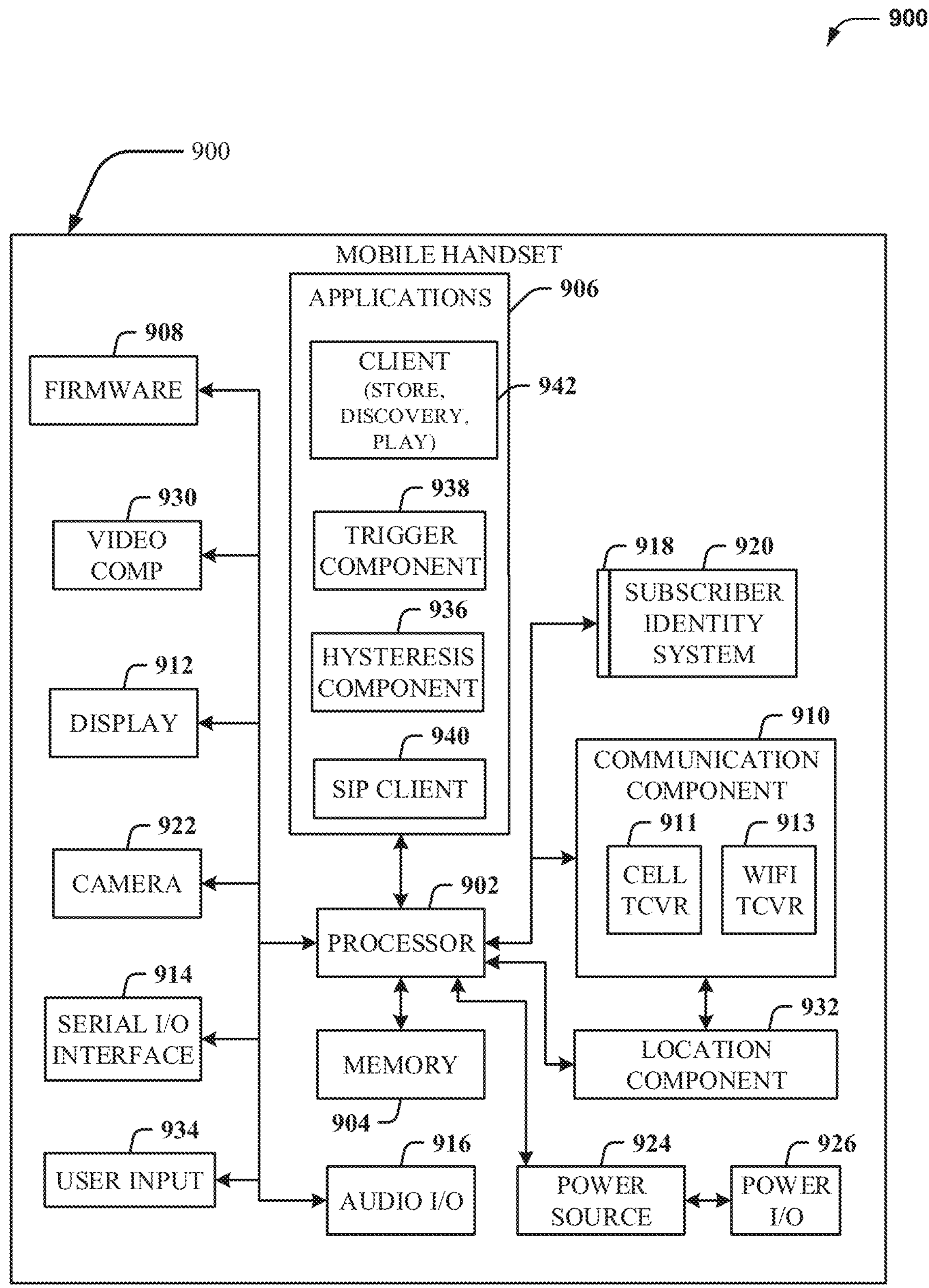
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a non-transitory machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 902.11, for the dual-mode GSM handset 900. The handset 900 can accommodate at least satellite radio services through a handset that can combine wireless voice and digital radio chipsets into a single handheld device.

Figure 10:
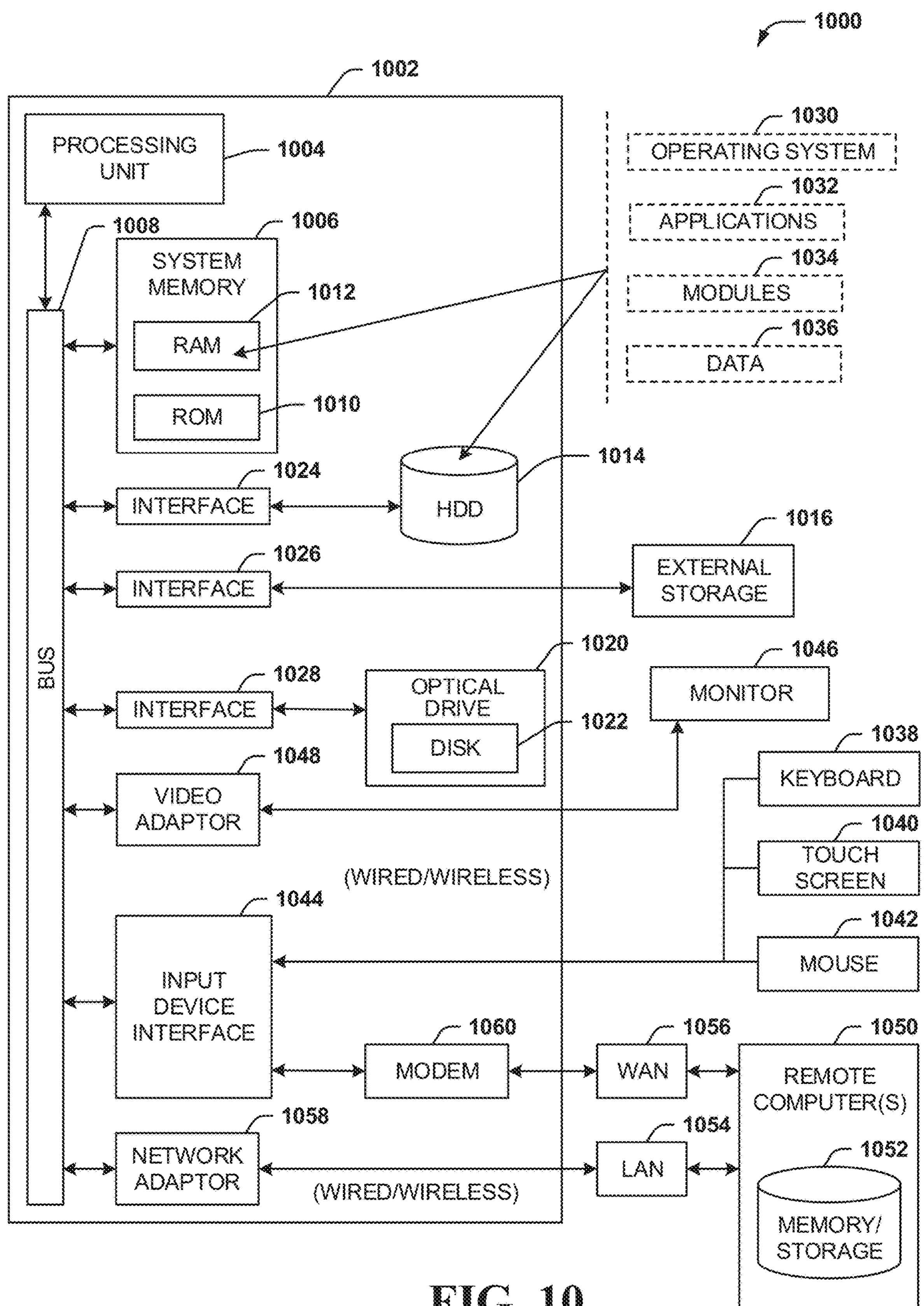
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server and/or communication device.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 994 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather are to be construed in breadth, spirit and scope in accordance with the appended claims.

What is claimed is:

1. A system, comprising:

a processor; and a memory that stores executable instructions that, when executed by the processor, facilitate performance of operations, comprising:

receiving a first message, wherein the first message comprises a network communication device identification and a feature tag having a language indication that indicates a language configuration of the network communication device;

in response to the receiving the first message, storing the language indication and associating the language indication with the network communication device identification;

determining whether an incoming call is not authenticated; and in response to the determining that the incoming call is not authenticated, transmitting a textual message to the network communication device using the language configuration to indicate the incoming call is not authenticated.

2. The system of claim 1, wherein the language indication comprises a textual value of the language configuration.

3. The system of claim 1, wherein the language indication comprises a numerical value of the language configuration.

4. The system of claim 1, wherein the operations further comprise:

in response to the receiving the first message, transmitting the first message to a first network node device.

5. The system of claim 1, wherein the operations further comprise:

in response to the receiving the first message, reformatting the first message; and transmitting the first message to a first network node device.

6. The system of claim 1, wherein the operations further comprise:

requesting a network communication device to transmit the first message that includes the language indication.

7. The system of claim 1, wherein the operations further comprise:

receiving a request from a first server to acquire the language configuration from the network communication device, wherein the request comprises the network communication device identification.

8. A method, comprising:

receiving, by a processor of a device, a first message, wherein the first message comprises a network communication device identification and a feature tag having a language indication that indicates a language configuration of the network communication device;

in response to the receiving the first message, storing, by the device, the language indication and associating the language indication with the network communication device identification;

determining, by the device, whether an incoming call is not authenticated; and in response to the determining that the incoming call is not authenticated, transmitting, by the device, a textual message to the network communication device using the language configuration to indicate the incoming call is not authenticated.

9. The method of claim 8, wherein the language indication comprises a textual value of the language configuration.

10. The method of claim 8, wherein the language indication comprises a numerical value of the language configuration.

11. The method of claim 8, further comprising:

in response to the receiving the first message, transmitting, by the device, the first message to a first network node device.

12. The method of claim 8, further comprising:

in response to the receiving the first message, reformatting, by the device, the first message; and transmitting, by the device, the first message to a first network node device.

13. The method of claim 8, further comprising:

requesting, by the device, a network communication device to transmit the first message that includes the language indication.

14. The method of claim 8, further comprising:

receiving, by the device, a request from a first server to acquire the language configuration from the network communication device, wherein the request comprises the network communication device identification.

15. A non-transitory machine-readable storage medium, comprising executable instructions that, when executed by a processor, facilitate performance of operations, comprising:

receiving a first message, wherein the first message comprises a communication device identification and a feature tag having a language indication that indicates a language configuration of the network communication device;

in response to the receiving the first message, storing the language indication and associating the language indication with the communication device identification;

determining whether an incoming call is not authenticated; and in response to the determining that the incoming call is not authenticated, transmitting a textual message to the communication device using the language configuration to indicate the incoming call is not authenticated.

16. The non-transitory machine-readable storage medium of claim 15, wherein the language indication comprises a textual value of the language configuration.

17. The non-transitory machine-readable storage medium of claim 15, wherein the language indication comprises a numerical value of the language configuration.

18. The non-transitory machine-readable storage medium of claim 15, wherein the operations further comprise:

in response to the receiving the first message, transmitting the first message to a first network node device.

19. The non-transitory machine-readable storage medium of claim 15, wherein the operations further comprise:

in response to the receiving the first message, reformatting the first message; and transmitting the first message to a first network node device.

20. The non-transitory machine-readable storage medium of claim 15, wherein the operations further comprise:

requesting a communication device to transmit the first message that includes the language indication.

21. The non-transitory machine-readable storage medium of claim 15, wherein the operations further comprise:

receiving a request from a first server to acquire the language configuration from the network communication device, wherein the request comprises the communication device identification.

22. A system, comprising:

a processor; and a memory that stores executable instructions that, when executed by the processor, facilitate performance of operations, comprising:

receiving a first message, wherein the first message comprises a network communication device identification and a feature tag having a language indication that indicates a language configuration of the network communication device;

in response to the receiving the first message, storing the language indication and associating the language indication with the network communication device identification;

receiving an incoming SIP METHOD and determining whether the incoming SIP MEHTOD is not authenticated; and in response to the determining that the incoming SIP METHOD is not authenticated, transmitting a textual message to the network communication device using the language configuration to indicate the incoming call is not authenticated.

23. The system of claim 22, wherein the language indication comprises a numerical value of the language configuration.

24. The system of claim 22, wherein the operations further comprise:

in response to the receiving the first message, transmitting the first message to a first network node device.

25. The system of claim 22, wherein the incoming SIP METHOD is a SIP INVITE.

26. The system of claim 22, wherein the incoming SIP METHOD is a SIP MESSAGE.

27. The system of claim 22, wherein the first message is a SIP REGISTRATION message.

28. The system of claim 22, wherein the first message is a NAS REGISTRATION message.

29. The system of claim 22, wherein the first message is a NAS ATTACH message.

30. The system of claim 22, wherein the language indication comprises a textual value of the language configuration.

31. The system of claim 22, wherein the language indication is coded according to ISO 639-1.

32. The system of claim 22, wherein the language indication is coded according to ISO 639-2.

33. The system of claim 22, wherein the incoming SIP METHOD is any combination of a SIP INVITE and a SIP MESSAGE.

34. The system of claim 22, wherein the first message is any combination of: a SIP REGISTRATION, a NAS REGISTRATION, an UL NAS TRANSPORT, a mobility management update, and a NAS ATTACH.

35. The system of claim 22, wherein the first message is a mobility management update.

36. The system of claim 22, wherein the first message is an uplink NAS TRANSPORT.

37. The system of claim 22, wherein the language indication is coded as any combination of ISO 639-1 and ISO-639-2.

* * * * *